(12) United States Patent
Dourthe et al.

(10) Patent No.: US 8,468,039 B2
(45) Date of Patent: Jun. 18, 2013

(54) METHOD FOR HANDLING LARGE AMOUNTS OF STANDARD DATA

(75) Inventors: Cédric Dourthe, Nice (FR); Thierry Dufresne, Opio (FR); Pierre Etienne Melet, Biot (FR); Gilles Chaumont, Valbonne (FR)

(73) Assignee: Amadeus S.A.S., Sophia Antipolis (FR)

( * ) Notice: Subject to any disclaimer, the term of this patent is extended or adjusted under 35 U.S.C. 154(b) by 1056 days.

(21) Appl. No.: 11/599,381

(22) Filed: Nov. 15, 2006

(65) Prior Publication Data

US 2008/0114796 A1     May 15, 2008

(51) Int. Cl.
*G06Q 10/00*       (2012.01)
(52) U.S. Cl.
USPC .......................................................... 705/5
(58) Field of Classification Search
USPC .......................................................... 705/5
See application file for complete search history.

(56) References Cited

U.S. PATENT DOCUMENTS

| | | | |
|---|---|---|---|
| 2002/0156629 A1* | 10/2002 | Carberry et al. | 704/257 |
| 2004/0199429 A1 | 10/2004 | Kwoh | |
| 2005/0004819 A1* | 1/2005 | Etzioni et al. | 705/5 |
| 2005/0131743 A1 | 6/2005 | Callaway et al. | |

FOREIGN PATENT DOCUMENTS

WO   WO 2005/055099      6/2005

OTHER PUBLICATIONS

PR Newswire, "Farecast.com Now Available From Over 55 Cities Nationwide; Free airfare predictions help travelers know when to buy airline tickets." Aug. 21, 2006.*

* cited by examiner

*Primary Examiner* — John Hayes
*Assistant Examiner* — Allen J Jung
(74) *Attorney, Agent, or Firm* — Wood, Herron & Evans, LLP

(57) ABSTRACT

A method for handling large amounts of standard data contained in one or more databases conforming to a standard data model is described. When large amounts of standard data are needed to answer requests of end-users of a software application, the method assumes that a significantly reduced amount of metadata useable by the software application are first built out of the large amounts of standard data. The metadata are stored in an intermediate database of metadata and delivered to the software application through a metadata engine in lieu of the large amounts of standard data. The invention allows software application to consider much larger amounts of standard data to better answer end-user requests in an acceptable elapsed time.

17 Claims, 5 Drawing Sheets

Prior Art

METHOD FOR HANDLING LARGE AMOUNTS OF STANDARD DATA

FIELD OF THE INVENTION

The present invention relates generally to software applications that need to gather a significant amount of data from large databases in order to answer end-user requests and more specifically refers to a method of preprocessing database contents.

BACKGROUND OF THE INVENTION

Databases are the convenient means for storing the data of a countless number of applications, including all sorts of technical, scientific, educational, industrial or commercial applications. Each database is managed through a database management system (DBMS), a suite of programs designed to let many users have access simultaneously to the stored data by issuing queries, i.e., requests to retrieve specific information from the database.

Relational databases are often used which organize data into tables made of a collection of rows or records and where each row in a table contains the same fields. Relational databases are then typically accessed using an industry standard language such as SQL which stands for structured query language.

Over time, constant improvements brought to better organize the stored data and the queries to retrieve the searched information from an ever growing number of users have dramatically improved databases processing efficiency. Combined with advances in computer hardware and storing capacities current large database management systems are indeed able to manage concurrently hundreds and even thousands of requests on databases containing millions of records if not billions of them for the largest.

In spite of all the performance improvements brought to databases the level of expectation of those who are putting together the information and the end-users of them has grown at an even faster pace. Especially, more and more sophisticated software applications need in fact to access several databases to operate and provide their services to numerous end-users. An example of such a system is shown in FIG. 1 where a particular software application (100) needs to process data gathered, for example, from three independent databases (111, 121 and 122) to become capable of answering user's requests (130) so that to deliver them the requested information (150). In this particular example, yet typical of the kind of applications considered by the invention, the independent databases are assumed to be managed by two different organizations having their own systems (110, 120) and which are the providers of information (115, 125) needed by the software application (100) to accomplish its task. Typically, the interface with the end-users is achieved through a web site so that a world-wide access is possible from any personal computer connected to the Internet and equipped with a standard web browser. Requests are then issued directly by the end-users from the site interface (130) and responses delivered e.g., under the form of dynamic web pages to their respective browsers (140). The application software (101) is thus in charge of processing the information that is collected from the various databases that must be consulted to format a response. Generally, to expedite the interrogations of the databases, a dedicated engine is needed per information provider system. Two are shown (102, 103) in the example of FIG. 1.

The typical system illustrated in FIG. 1 works well as long as the amount of information to be collected from the databases in order to format a response to the end-users in an acceptable elapsed time (i.e., in practice, within a few seconds maximum) stays relatively low. However, in spite of all the here above mentioned improvements brought to databases over the years, the 'cost' of processing database transactions (i.e., the processing time and the resources required to execute a query) is often detrimental to actually achieve this objective when the number of queries that must be issued by the application, to be able to answer end-user requests, is significantly growing. Also, the amount of active memory required by the software application to temporarily store all the transferred pieces of information from the databases may become prohibitive in view of the number of end-users that must be simultaneously supported. This is however what the more recent sophisticated software applications tend now to require in an attempt to offer to end-users of those web sites an always broader level of services.

It is thus a broad object of the invention to overcome the difficulties mentioned here above when a large amount of information must be gathered from several databases by a software application to format responses to end-users in an acceptable elapsed time.

It is more specifically an object of the invention to disclose a method of preprocessing database contents to expedite the search of information and reduce the overall amount of data that need to be transferred and processed by the software application.

It is also an object of the invention to permit that data-intensive software applications become feasible in the framework of a web site capable of supporting simultaneously numerous remote users.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method for handling large amounts of standard data contained in one or more databases conforming to a standard data model. When large amounts of standard data are needed to answer requests of end-users of a software application the method of the invention assumes that a significantly reduced amount of metadata useable by the software application are first built out of the large amounts of standard data. The metadata are stored in an intermediate database of metadata and delivered to the software application through a metadata engine in lieu of the large amounts of standard data. Building of the metadata first consists in determining a drastically reduced set of metadata on the basis of a discriminating criterion applying to the standard data. Then, the drastically reduced set of metadata is expanded to have them still conforming to a set of rules attached to the standard data in the database considered. Also, the metadata engine further reduces the combination of delivered metadata that needs to be used by the software application.

In one application of the invention the standard data are airline fares and the discriminating criterion the ticketing dates used when tickets are issued so that a fares search application according to the invention can include the generation and display of a referential of fares as a function of ticketing dates.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figures 2, 2A:
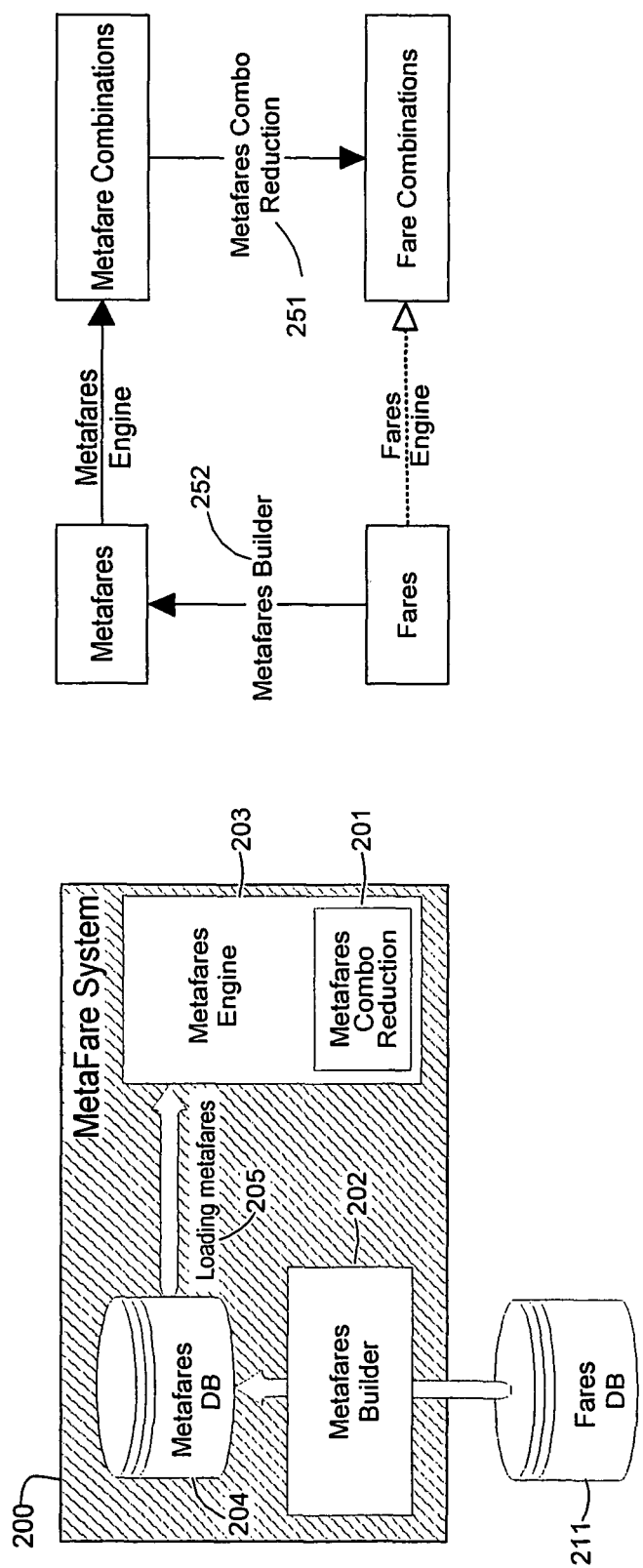
FIG. 2 and FIG. 2A describe through an example of a large database of airline fares how its contents are processed.

FIG. 2 illustrates through an example the case of a large database whose content needs to be pre-processed to meet the above objectives of the invention. In this example a database of airline fares is considered (211). Fares published by airlines companies are countless and are constantly updated. Those fares must be made available to all the actors of the travel and transportation industry. Especially, to the global distribution systems (GDS) and computer reservation systems (CRS); i.e., any of several proprietary large computer systems that need to have real-time access to airline fares, schedules, and seating availability to offer to travel agencies, from all over the world, the capability of booking reservations and generating tickets.

Figure 1:
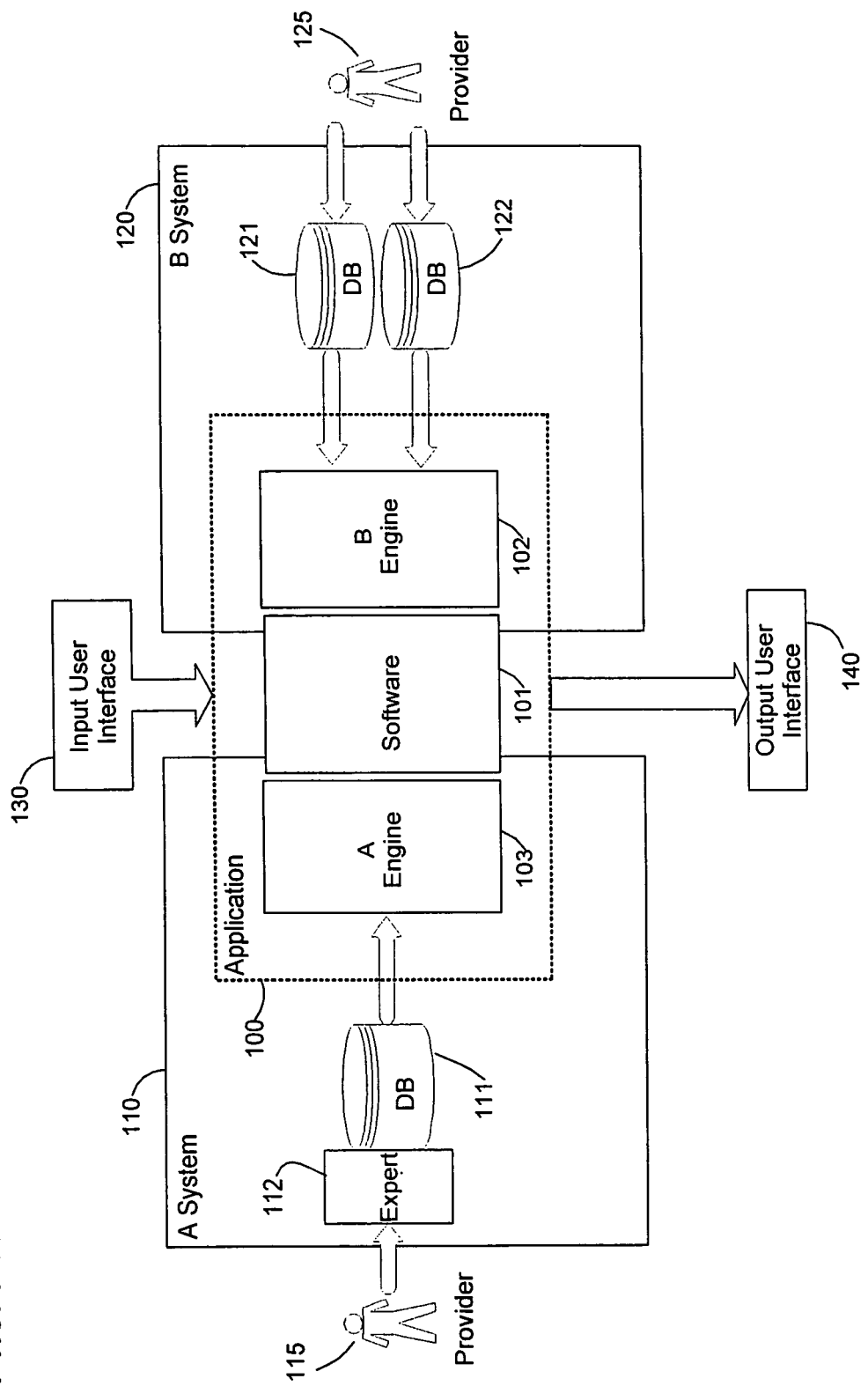
FIG. 1 shows a software application of the prior art that needs to access several databases to answer requests issued by end-users of the application.

Airline tariff publishing company (ATPCO), collectively owned by a group of major international airlines, collects airline fares and fare related data from more than 500 airlines and distributes the information to the travel industry participants including, GDS's, travel agencies and travel-related companies, under the form of a large database that is kept updated within an always operational (redundant) powerful data center. Thus, ATPCO database, that gather fares of all airlines, contains millions of fare records that are made accessible to the numerous software applications of the kind discussed with FIG. 1 in the background section. This example of a large database administrated by an independent entity thus corresponds to the A system (110) of FIG. 1. The management of such a database needs a high level of expertise (112) to maintain contents current and performances at their optimal level. Also, it becomes a de-facto standard because of its world-wide use by a whole industry, the travel and transportation industry in this example. As a consequence, its contents conform to a standard data model which cannot be changed to be tailored to a particular application since this would impact all the other applications.

Even though database (211) performances are maintained at their best level by its administrators, sophisticated software applications that handle data-intensive end-user requests cannot answer them in an acceptable elapsed time (i.e., a few seconds) when too many pieces of information must be collected and processed from the database. Since, for the reasons mentioned above, database itself cannot be adapted to better fit a single software application, pre-processing of the database contents must be performed to reach the expected level of performances. According to the invention, an intermediate database (204), part of the software application (200), is then put in place. In the particular example used to illustrate the invention this intermediate database (204) contains metafares that are built (202) out of the huge amount of fares made available from the standard fares database (211) discussed above. Metafares allow a dramatic reduction of fares to be considered by the application.

The engine mentioned earlier, part of the software application and aimed at accessing the database, becomes the metafare engine (203) tailored to access and process the metafares database, instead of the fares database (211), to produce metafare combinations instead of fare combinations. The engine includes a reduction module (201) aimed at dynamically reducing metafare combinations to the set of possible fare combinations. As further depicted in FIG. 2A, metafare builder (252) and metafare reduction (251) are converse processes framing the metafare engine and sparing it the computation of vast amounts of fares. A great deal of complexity is taken over by metafare builder as to ease metafare engine computing tasks.

The implementation of the above scheme, which allows a considerable reduction of the amount of data to be fetched and processed by a software application, opens the door to the development of applications that would not otherwise be possible because of the huge amount of data that would have to be fetched from the standard database to answer a single end-user request. As an example of such an application, in the travel industry, search engines to book flights are very common. Especially, low-cost flight search engines accessible to any one from travel web sites are devised to find good travel opportunities. Even though their efficiency may vary significantly from one site to the other many can indeed return a true best opportunity (i.e., lowest cost) to fly from a given origin to a certain destination. All have in common though that the opportunities returned by the search engine are for the current ticketing date. As mentioned earlier, travel fares, especially, airlines fares have a quite complex structure and the price of booking a same trip varies significantly along the year. For example, following round trip flight from New York to San Francisco:

[NYC-SFO-C00018-23 Dec. 2006]
[SFO-NYC-C00019-29 Dec. 2006]

is best priced at 533$ with fares [IK1USE-ILW2S3E] and ticketing date on Nov. 4, 2006 while it is best priced at 937$, almost twice as much though, with fares [NKWEE3E-NKWEE3E] and ticketing date on Dec. 22, 2006.

Although the corresponding data are actually present in the standard database of fares, search engines always assume that actual booking date (ticketing date) is the current one, i.e., the one when search is performed (expecting that booking will actually take place the same day). Therefore, a traveler looking for good travel opportunities has just no idea of what he/she would have to pay for a certain flight if booking were postponed or what he/she would have paid if booking had been anticipated. In other words, traveler has no reference to which he/she can compare the travel opportunities currently returned by the search engine.

The only reason for which this is not presently done it is because the amount of data to fetch and process by the software application, a low-cost fare search engine in this case, would be much too large since 365 possible ticketing dates would have to be potentially considered. However, applying the scheme of the invention, the metafare builder (202) can easily build a reduced intermediate database of metafares (204) from the standard database of fares (211) as shown through the two following examples.

First example assumes that two standard fares (QAP4 and QAP7) are available.

| FARE | BASIS | OW | EUR | RT | B | PEN | DATES/ DAYS | AP MIN |
|---|---|---|---|---|---|---|---|---|
| MAX R | | | | | | | | |
| QAP4 | | | | 172 | Q | NRF | — — | 4 + SU |
| 1M R | | | | | | | | |
| QAP7 | | | | 150 | Q | NRF | — — | 7 + SU |
| 1M R | | | | | | | | |

Because the two fares share the same characteristics, except for amount and advanced purchase (AP), a single metafare (AFQAP) can replace both standard fares as follows:
FareBasis: AFQAP
Amounts: (1) EUR 172 [from −4 days to −6 days]
(2) EUR 150 [from −7 days]
+common characteristics (MIN, MAX . . . )
Thus, using this metafare for a one way trip, and a departure date on Feb. 1, 2006 following options are available:
AFQ (2), EUR 150, ticketing before 25 Jan. 2006 (i.e. 1 February-7 days)
AFQ (1), EUR 172, ticketing after 26 Jan. 2006 (i.e. 1 February-6 days)
and before 28 Jan. 2006 (i.e. 1 February-4 days)
In another example, four fares (MAP1, QAP4, QAP7 and WAP10) are considered:

| FARE | BASIS | OW | EUR | RT | B | PEN | DATES/ DAYS | AP MIN |
|---|---|---|---|---|---|---|---|---|
| MAX R | | | | | | | | |
| MAP1 | | | | 210 | M | NRF | — — | 1 + SU |
| 1M R | | | | | | | | |
| QAP4 | | | | 172 | Q | NRF | — — | 4 + SU |
| 1M R | | | | | | | | |
| QAP7 | | | | 150 | Q | NRF | — — | 7 + SU |
| 1M R | | | | | | | | |
| WAP10 | | | | 126 | W | NRF | — — | 10 + SU |
| 1M R | | | | | | | | |

Since all four fares share the same characteristics except for amount, booking code and advanced purchase (AP) a single metafare (AFXAP) can replace all of them as follows:
FareBasis: AXAP
Amounts/Booking: (1) EUR 210 [−1--−3]/M
(2) EUR 172 [−4--−6]/M
(3) EUR 150 [−7--−9]/Q
(4) EUR 126 [−10]/w
It is thus the role of the metafare builder (202) to parse and aggregate standard fares and rules into metafares in order to build the metafare database (204), a reduced database of fares which can then be interrogated by the metafare engine (203) of the software application in lieu of the standard database of fares.

Figure 3:
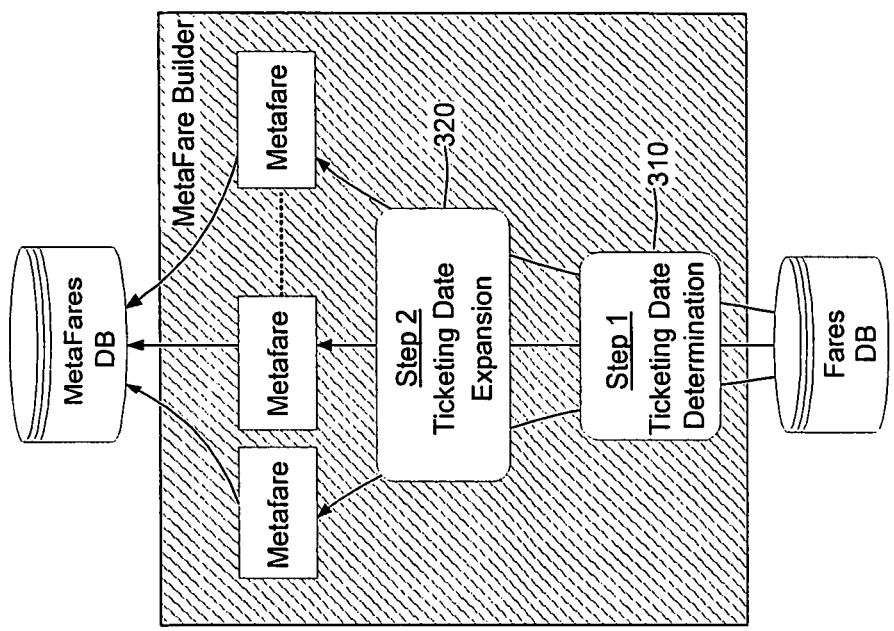
FIG. 3 discusses the steps of the method for processing database contents.

The steps of the method through which metafare builder obtain the metafares are shown in FIG. 3. The first step (310) consists in scanning the proper tables of the standard fares database to determine, on the basis of the ticketing dates, as fewer metafares as made possible by considering also all the rules attached to the published fares and the fare-by-rule constraints (i.e., the automated rules supplied by the owner of the standard fares database to create new fares from the existing published ones). Rules attached to a fare include, for example, constraints on advance purchase, availability of fare only within a certain range of dates or do not allow a stop-over in an itinerary. The first step (310) thus allows a dramatic reduction of the fares so that N fares are combined into M1 metafares with M1<<N.

Following example explains, from data found in Fare DB, how fare-by-rule constraints are parsed in first step
FareBasis: DISC1
Base Amount: EUR 120
Adv Purchs.: ticket at least 5 days before departure
Stopover: surcharge EUR 60 each
(fare-by-rule) for stopover surcharges, discount 25% for TKT date 1 June-30 August
Such fare data should be expanded in two metafares:
FareBasis: DISC1-1
Amounts: EUR 120 [1 January-31 May]
OR EUR 120 [1 September-31 December]
Adv Purchs.: ticket at least 5 days before departure
Stopover: surcharge EUR 60 Each
and
FareBasis: DISC1-2
Amounts: EUR 120 [1 June-30 August]
Adv Purchs.: ticket at least 5 days before departure
Stopover: surcharge EUR 45 Each
The second step (320) must however somehow expand the above number of metafares (M1) in order to adjust ticketing date intervals so that all metafares created by the first step can still obey the rules of the standard database of fares. Although output of the second step may return an M2 number of metafares with M2>M1 it remains that the number of created fares of the metafares database is much lower than the ones of the standard database of fares so that M2<<N is still true.

The following example explains how metafares are modified in second step:
FareBasis: DISC1-2
Amounts: EUR 120 [1 June-30 August]
Adv Purchs.: ticket at least 5 days before departure
Stopover: surcharge EUR 45 Each
is modified into:
FareBasis: DISC1-2
Amounts: EUR 120 [1 June-30 August]
AND 5 days before departure
Stopover: surcharge EUR 45 Each
In this example we see that ATPCO constraints are expressed into ticketing date intervals.

The converse process of metafare building; i.e., the metafare combinations reduction, is aimed at building all possible fare combinations and determining all possible ticketing dates given a metafare combination.

For example, the following metafare combination built on the metafare previously described and composed of two one-way segments:
AFAQP-AFAQP
if used for a trip starting on February 1 and returning on February 10, would reduce into two fare combinations:

| before 25 jan | QAP7—QAP7 | 300 EUR |
| from 26 jan to 28 jan | QAP4–QAP7 | 322 EUR |

Figure 4:
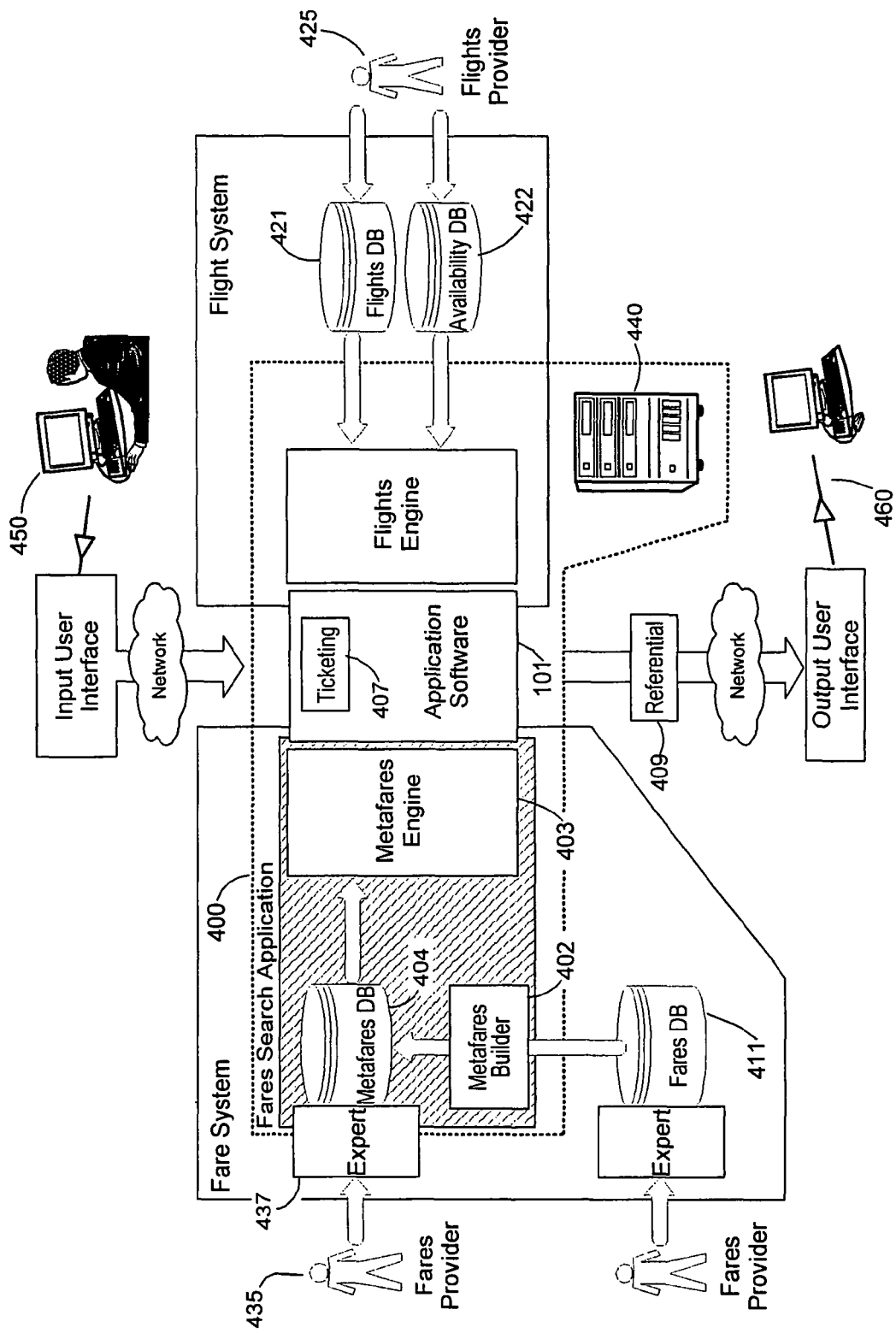
FIG. 4 shows, in its environment, a software application implementing the scheme of the invention.

FIG. 4 depicts in its environment a fares search application (400) of the kind made possible by the use of the scheme of the invention.

The overall application, running on a computer system (440), now includes or can enable the components as described in FIG. 2 and FIG. 3; namely, a metafares database (404), a metafares builder (402) and a metafares engine (403). They are aimed at reducing significantly the amount of data to be manipulated by a fares search application while including enhanced functions made available to the end-users of an improved web site to make it more attractive. Especially, metafares allow taking into consideration ticketing dates. The application software (401) includes a module (407) in charge of making sure that all ticketing dates implied by the requests issued by the end-users (450) and being processed are indeed available from the metafares database and are compliant with the rules of the standard fares database. This enables the possibility of delivering (460) to the end-users a referential of lowest airfare solutions (409), an application of which is described in following figures. Travel solutions are built as usual in consulting also the databases (421, 422) of a flight system to determine routes and actual availability of flights to be combined with the fares to provide a complete travel solution. Flights databases get their inputs from the provider of flights (425), the airlines companies.

As explained above, metafares are essentially built from a standard database of fares (411) e.g., the ATPCO database previously mentioned. However, metafares can also be managed directly through an appropriate interface (437) of the database handling directly inputs from a fares provider that would provide metafares instead of standard fares.

Figures 5, 6:
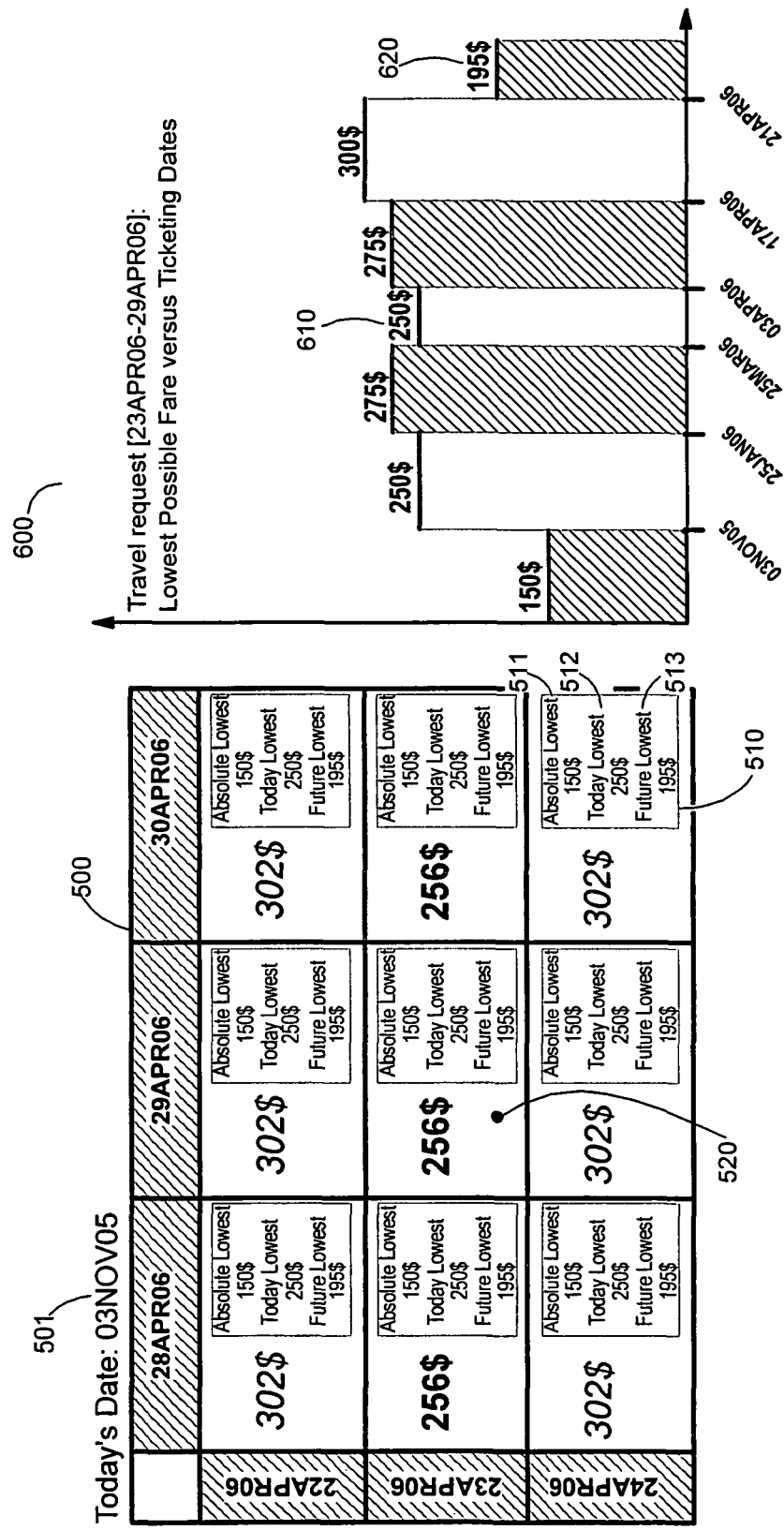
FIG. 5 and FIG. 6 together describe a travel application made possible with the use of the invention.

FIG. 5 shows how a calendar product (500) can be enhanced taking advantage of the invention in the framework of a software application as discussed in previous figures.

A calendar is aimed at returning the best available combinations of flights and fares by travel date. In this example, current date is assumed to be the $3^{rd}$ of Nov. 2005 where an end-user of the application requests a round trip from New-York to San Francisco leaving around the $23^{rd}$ of Apr. 2006 and returning to New-York around the $29^{th}$ of Apr. 2006. Then, for example, calendar would display nine travel solutions including for convenience leaving and returning dates on the days immediately before and after the selected travel days. The nine amount displayed are the lowest available fares found by the associated fares search engine for the current ticketing date i.e., Nov. 3, 2005 (501). According to the invention the nine displayed fare opportunities can however be much enhanced with the concurrent display of a lowest fares referential (510) comprised of three fare values: an absolute lowest possible fare, i.e., the lowest possible fare that it would be possible to obtain for the request irrespective of actual availability and current ticketing date (511); today's lowest possible fare irrespective of availability for current ticketing date (512) and the lowest possible fare for a future ticketing date (513). End-user of the application can thus conveniently compare the available fare opportunities to the best possible ones displayed in the referential. He/she learns that today's lowest possible fare has been (hardly) missed for the row of dates corresponding to Apr. 23, 2006 since lowest available fare is worth 256$ for those dates while today's lowest fare of referential is 250$. End-user also learns that in the future he/she could expect a better deal of 195$ if ticketing date is postponed. More information has been gathered by the application that can be further displayed e.g., by clicking on the case corresponding to Apr. 23, 2006/Apr. 29, 2006 (520). End-user is then returned the graphic (600) of FIG. 6 showing the corresponding evolution of the lowest possible fare versus ticketing dates. Therefore, he/she further learns that booking would have to be postponed till the $25^{th}$ of Mar. 2006 to take advantage of the better 250$ fare since there is again a favorable ticketing period (610) starting that day. Also booking could be possibly delayed until a few days before departure (however, with a risk of not having any available opportunity left at that time) in an attempt to benefit of an even much better fare whose booking period (620) starts on the $21^{st}$ of Apr. 2006.

End-user of the application, by getting such a referential with the travel fare opportunities he/she is offered, is in a much better position to make a timely decision:

within what is displayed by the calendar there is indeed a best opportunity to pick for the intermediate row corresponding to departing date of Apr. 23, 2006 i.e., 256$ versus 302$.

today's lowest available is only 6$ higher than today's lowest possible fare of 250$.

today's date is not the best booking date compared to absolute lowest and future lowest fare amounts (256$ versus 150$ and 195$) but future lowest booking period, starting on the $21^{st}$ of Apr. 2006, is risky since it is very close to the April 23 departing date.

What is claimed is:

1. A method for handling standard fare data contained in a fare database, the method, comprising:
building, via a computer processor out of the standard fare data, standard fare metadata used by a fare search application that operates on a client operated by an end-user, wherein building the fare metadata further comprises determining the standard fare metadata on the basis of a discriminating criterion applicable to the standard fare data, and expanding the standard fare metadata such that the standard fare metadata conforms to a set of rules associated with the standard fare data in the standard fare database, the discriminating criterion comprising ticketing dates used when a travel ticket is issued;
storing the standard fare metadata in an intermediate database on a server remote from the client;
delivering said standard fare metadata to the fare search application through a fare metadata engine in lieu of the standard fare data;
subsequent to storing the standard fare metadata in the intermediate database, receiving a request from the client, said request comprising an intended date of travel;
processing the request at the fare metadata engine by accessing the intermediate database; and
returning an answer to the client, the answer comprising a plurality of fares with associated travel dates based on a date on which the request is processed and, with each fare, each of i) an absolute lowest possible fare irrespective of availability and irrespective of the date on which the request is processed, ii) a lowest possible fare based on the date on which the request is processed but irrespective of availability, and iii) a lowest possible fare for a future ticketing date.

2. The method of claim 1, wherein delivering said standard fare metadata further comprises:
further reducing in the fare metadata engine, the delivered fare that needs to be used by the fare search application.

3. The method of claim 1, wherein the fare database of standard fare data comprises a database of airline fares.

4. The method of claim 1, further comprising:
generating a referentiality of fares versus at least one of said ticketing dates; and
displaying the referentiality of fares.

5. The method of to claim 4, wherein the referentiality of fares includes the absolute lowest possible.

6. The method according to claim 4, wherein the referentiality of fares includes the lowest possible fare based on the date on which the request is processed but irrespective of availability.

7. The method of claim 4, wherein the referentiality of fares includes the lowest possible fare for the future ticketing date.

8. The method of claim 4, wherein displaying the referentiality of fares further a graphic showing an evolution of lowest fares versus all ticketing dates.

9. The method of claim 5, wherein the display of the referentiality of fares further includes a display of a graphic showing an evolution of lowest fares versus all said ticketing dates.

10. The method of claim 6, wherein the display of the referentiality of fares further includes a display of a graphic showing an evolution of lowest fares versus all said ticketing dates.

11. The method of claim 7, wherein the display of the referentiality of fares further includes a display of a graphic showing an evolution of lowest fares versus all said ticketing dates.

12. The method of claim 1, wherein the fare information returned to the user is actual fare data of an actual flight.

13. The method of claim 12, wherein the actual fare data of an actual flight comprises an actual fare price.

14. A fares search system comprising:
a database containing standard fare data;
a metadata database; and
a computer programmed with a fare search application that operates on a client operated by an end-user to answer queries of the end-user,
wherein the fare search application is configured to:
build out of the standard fare data in the database, standard fare metadata by determining the standard fare metadata on the basis of a discriminating criterion applicable to the standard fare data and expanding the standard fare metadata such that the standard fare metadata conforms to a set of rules associated with the standard fare data in fare database, the discriminating criterion comprising ticketing dates used when a travel ticket is issued;
store the standard fare metadata in an intermediate database on a server remote from the client;
deliver said standard fare metadata to the fare search application through a fare metadata engine in lieu of the standard fare data;
subsequent to storing the standard fare metadata in the intermediate database, receive a request from the client, said request comprising an intended date of travel;
process the request at the fare metadata engine by accessing the intermediate database; and
return an answer to the client, the answer comprising a plurality of fares with associated travel dates based on a date on which the request is processed and, with each fare, each of i) an absolute lowest possible fare irrespective of availability and irrespective of the date on which the request is processed, ii) a lowest possible fare based on the date on which the request is processed but irrespective of availability, and iii) a lowest possible fare for a future ticketing date.

15. The fares search system of claim 14, wherein the fare search application is further configured to:
generate generate a referentiality of fares versus at least one of the ticketing dates; and
display the referentiality of fares.

16. A non-transitory computer program product comprising:
a computer readable storage medium; and
a computer program stored on the computer readable storage medium, the computer program comprising computer readable code for causing at least one processing device to:
build, out of standard fare data in a fare database, fare metadata used by a fare search application that operates on a client operated by an end-user, wherein the computer readable code for causing at least one processing device to build the fare metadata further comprises computer readable code for causing at least one processing device to determine the standard fare metadata on the basis of a discriminating criterion applicable to the standard fare data, and the standard fare metadata such that the standard fare metadata conforms to a set of rules associated with the standard fare data in the standard fare database, the discriminating criterion comprising ticketing dates used when a travel ticket is issued;
store the standard fare metadata in an intermediate database on a server remote from the client;
deliver the standard fare metadata to the fare search application through a fare metadata engine in lieu of the standard fare data;
subsequent to storing the standard fare metadata in the intermediate database, receive a request for from the client, said request comprising an intended date of travel;
process the request at the fare metadata engine by accessing the intermediate database; and
return an answer to the client, the answer comprising a plurality of fares with associated travel dates based on a date on which the request is processed and, with each fare, each of i) an absolute lowest possible fare irrespective of availability and irrespective of the date on which the request is processed, ii) a lowest possible fare based on the date on which the request is processed but irrespective of availability, and iii) a lowest possible fare for a future ticketing date.

17. The computer program product of claim 16, further comprising computer readable code for causing at least one processing device to generate a referentiality of fares versus at least one of the ticketing dates and display the referentiality of fares.

* * * * *

UNITED STATES PATENT AND TRADEMARK OFFICE
CERTIFICATE OF CORRECTION

| | |
|---|---|
| PATENT NO. | : 8,468,039 B2 |
| APPLICATION NO. | : 11/599381 |
| DATED | : June 18, 2013 |
| INVENTOR(S) | : Cedric Dourthe |

It is certified that error appears in the above-identified patent and that said Letters Patent is hereby corrected as shown below:

In the Claims:

At column 8, claim number 1, line number 21, after "method", delete ",".

At column 8, claim number 5, line number 62, after "of" delete "to" and at line 63 after "possible" insert --fare--.

At column 9, claim number 8, line number 4, after "further" insert --includes--.

At column 10, claim number 15, line number 6, after "generate" delete "generate".

At column 10, claim number 16, line number 35, after "request" delete "for".

Signed and Sealed this
Third Day of September, 2013

Teresa Stanek Rea
*Acting Director of the United States Patent and Trademark Office*